(12) United States Patent
Grimm et al.

(10) Patent No.: US 8,416,556 B2
(45) Date of Patent: Apr. 9, 2013

(54) POWER CAPACITOR

(75) Inventors: Wilhelm Grimm, Roth (DE); Wilhelm Hübscher, Heldenfingen (DE); Harald Vetter, Heidenheim (DE); Gerhard Hiemer, Nürnberg (DE); Edmund Schirmer, Postbauer/Heng (DE); Hermann Kilian, Diespeck (DE); Hermann Bäumel, Neumarkt i. Opf. (DE); George Dietrich, Bayreuth (DE)

(73) Assignees: Conti Temic Microelectronic GmbH, Nürnberg (DE); EPCOS AG, Munich (DE)

( * ) Notice: Subject to any disclaimer, the term of this patent is extended or adjusted under 35 U.S.C. 154(b) by 0 days.

(21) Appl. No.: 11/913,391

(22) PCT Filed: Apr. 25, 2006

(86) PCT No.: PCT/DE2006/000716
§ 371 (c)(1),
(2), (4) Date: May 20, 2008

(87) PCT Pub. No.: WO2006/116967
PCT Pub. Date: Nov. 9, 2006

(65) Prior Publication Data
US 2009/0059467 A1 Mar. 5, 2009

(30) Foreign Application Priority Data

May 2, 2005 (DE) .......................... 10 2005 020 320
Jul. 5, 2005 (DE) .......................... 10 2005 031 366

(51) Int. Cl.
*H01G 4/228* (2006.01)
*H01G 4/32* (2006.01)
*H01G 4/00* (2006.01)
*H01G 2/10* (2006.01)
*H02B 1/26* (2006.01)

(52) U.S. Cl. ............... 361/306.1; 361/301.1; 361/301.5; 361/306.3; 361/312; 361/329; 361/524; 361/310; 361/535; 361/624

(58) Field of Classification Search .................. 361/624
See application file for complete search history.

(56) References Cited

U.S. PATENT DOCUMENTS 2,858,492 A * 10/1958 Lamphier ..................... 361/314
3,274,663 A * 9/1966 Bonenfant et al. ........... 29/25.42
(Continued)

FOREIGN PATENT DOCUMENTS
DE B20997 1/1956
DE 972237 6/1959
(Continued)

OTHER PUBLICATIONS

International Preliminary Report on Patentability in Application No. PCT/DE2006/000716, dated Nov. 13, 2007.
(Continued)

*Primary Examiner* — Bradley Thomas
(74) *Attorney, Agent, or Firm* — Fish & Richardson P.C.

(57) ABSTRACT

A power electronics module includes a capacitor having a trough-shaped housing and at least one capacitor winding. An electronic unit includes a base on which the capacitor is mounted. A cooling plate in thermal contact with a cooling surface of the capacitor is formed by a bus bar. The cooling plate is on the base of the electronic unit.

23 Claims, 8 Drawing Sheets

U.S. PATENT DOCUMENTS

| | | | |
|---|---|---|---|
| 3,711,746 A * | 1/1973 | King | 361/329 |
| 3,956,677 A * | 5/1976 | Quick | 361/308.1 |
| 4,240,127 A | 12/1980 | Fanning et al. | |
| 4,486,810 A * | 12/1984 | Tomita et al. | 361/306.1 |
| 4,633,368 A * | 12/1986 | Frederick | 361/328 |
| 5,034,849 A * | 7/1991 | Vetter | 361/302 |
| 5,041,942 A | 8/1991 | Carrico | |
| 5,057,648 A * | 10/1991 | Blough et al. | 174/561 |
| 5,132,896 A * | 7/1992 | Nishizawa et al. | 363/144 |
| 5,365,424 A * | 11/1994 | Deam et al. | 363/144 |
| 5,530,618 A * | 6/1996 | Carroll et al. | 361/329 |
| 5,581,437 A * | 12/1996 | Sebillotte et al. | 361/323 |
| 5,659,455 A * | 8/1997 | Herbert | 361/306.1 |
| 5,905,628 A * | 5/1999 | Okuno et al. | 361/303 |
| 6,021,040 A | 2/2000 | Suzuki et al. | |
| 6,088,215 A * | 7/2000 | Webb et al. | 361/306.3 |
| 6,094,337 A * | 7/2000 | Ueda et al. | 361/311 |
| 6,112,073 A * | 8/2000 | Lee et al. | 455/347 |
| 6,166,464 A * | 12/2000 | Grant | 310/68 R |
| 6,212,058 B1 | 4/2001 | Huber | |
| 6,236,566 B1 | 5/2001 | Regnier et al. | |
| 6,249,448 B1 * | 6/2001 | Regnier et al. | 363/144 |
| 6,262,876 B1 * | 7/2001 | Schimanek | 361/301.5 |
| 6,268,996 B1 | 7/2001 | Landsgesell | |
| 6,282,081 B1 | 8/2001 | Takabayashi et al. | |
| 6,307,733 B1 | 10/2001 | Maruyama et al. | |
| 6,493,249 B2 * | 12/2002 | Shirakawa et al. | 363/147 |
| 6,525,924 B2 * | 2/2003 | Guillet et al. | 361/511 |
| 6,525,950 B1 * | 2/2003 | Shirakawa et al. | 363/144 |
| 6,538,878 B1 * | 3/2003 | Acker et al. | 361/624 |
| 6,618,278 B2 * | 9/2003 | Suzuki et al. | 363/144 |
| 6,629,854 B2 * | 10/2003 | Murakami | 439/251 |
| 6,631,071 B2 | 10/2003 | Kitagawa et al. | |
| 6,636,429 B2 * | 10/2003 | Maly et al. | 361/818 |
| 6,791,854 B2 * | 9/2004 | Shirakawa et al. | 363/147 |
| 6,843,335 B2 * | 1/2005 | Shirakawa et al. | 180/65.1 |
| 6,857,626 B2 | 2/2005 | Burlage et al. | |
| 6,867,970 B2 | 3/2005 | Muller et al. | |
| 6,885,553 B2 * | 4/2005 | Pfeifer et al. | 361/688 |
| 6,888,235 B2 | 5/2005 | Lopata et al. | |
| 6,943,445 B2 * | 9/2005 | Shirakawa et al. | 257/724 |
| 6,954,368 B1 * | 10/2005 | Francoeur et al. | 363/144 |
| 6,987,670 B2 * | 1/2006 | Ahmed et al. | 361/699 |
| 7,151,661 B2 * | 12/2006 | Kimura et al. | 361/306.3 |
| 2001/0011183 A1 * | 8/2001 | Munshi | 607/1 |
| 2004/0095708 A1 * | 5/2004 | Takeda et al. | 361/504 |
| 2004/0230847 A1 * | 11/2004 | Patwardhan et al. | 713/300 |
| 2005/0168911 A1 | 8/2005 | Staib | |
| 2005/0168918 A1 * | 8/2005 | Araki et al. | 361/517 |
| 2005/0184602 A1 * | 8/2005 | Won | 310/36 |
| 2005/0263845 A1 * | 12/2005 | Saito et al. | 257/516 |
| 2006/0050468 A1 | 3/2006 | Inoue et al. | |
| 2006/0104006 A1 * | 5/2006 | Saito et al. | 361/301.3 |
| 2006/0146480 A1 * | 7/2006 | Thrap | 361/522 |
| 2006/0232942 A1 * | 10/2006 | Nakatsu et al. | 361/710 |
| 2006/0239050 A1 * | 10/2006 | Andersson et al. | 363/132 |
| 2006/0284308 A1 * | 12/2006 | Harada et al. | 257/729 |
| 2009/0040685 A1 | 2/2009 | Hiemer | |
| 2009/0195957 A1 | 8/2009 | Grimm et al. | |

FOREIGN PATENT DOCUMENTS

| | | |
|---|---|---|
| DE | 2157690 | 5/1973 |
| DE | 7901948 | 1/1979 |
| DE | 8136324 | 12/1981 |
| DE | 3443069 | 5/1988 |
| DE | 3723733 A1 * | 1/1989 |
| DE | 4008417 | 9/1991 |
| DE | 29802368 | 2/1998 |
| DE | 19741146 | 4/1999 |
| DE | 19845821 | 4/2000 |
| DE | 10153748 | 5/2003 |
| DE | 10301268 | 7/2003 |
| DE | 10345501 | 8/2005 |
| EP | 0022968 | 1/1981 |
| EP | 0471508 | 2/1992 |
| EP | 0598256 | 5/1994 |
| EP | 0616401 | 9/1994 |
| EP | 0949641 | 10/1999 |
| EP | 0994494 | 4/2000 |
| JP | 09-260180 | 10/1997 |
| JP | 10-064771 | 3/1998 |
| JP | 2003-133175 | 5/2003 |
| JP | 2004-319799 | 11/2004 |
| RU | RD 496036 | 8/2005 |
| WO | WO99/14774 | 3/1999 |
| WO | WO99/43190 | 8/1999 |
| WO | WO00/19788 | 4/2000 |
| WO | WO03/092023 | 11/2003 |
| WO | WO2005/029519 | 3/2005 |
| WO | WO2006/116967 | 11/2006 |

OTHER PUBLICATIONS

International Preliminary Report on Patentability in Application No. PCT/DE2006/0006636, dated Nov. 13, 2007.

International Search Report in Application No. PCT/DE2006/000663, dated Mar. 21, 2007.

International Search Report in Application No. PCT/DE2006/000716, dated Mar. 9, 2007.

Prosecution History in U.S. Appl. No. 11/918,931.

Prosecution History in U.S. Appl. No. 11/913,397.

* cited by examiner

FIG 4
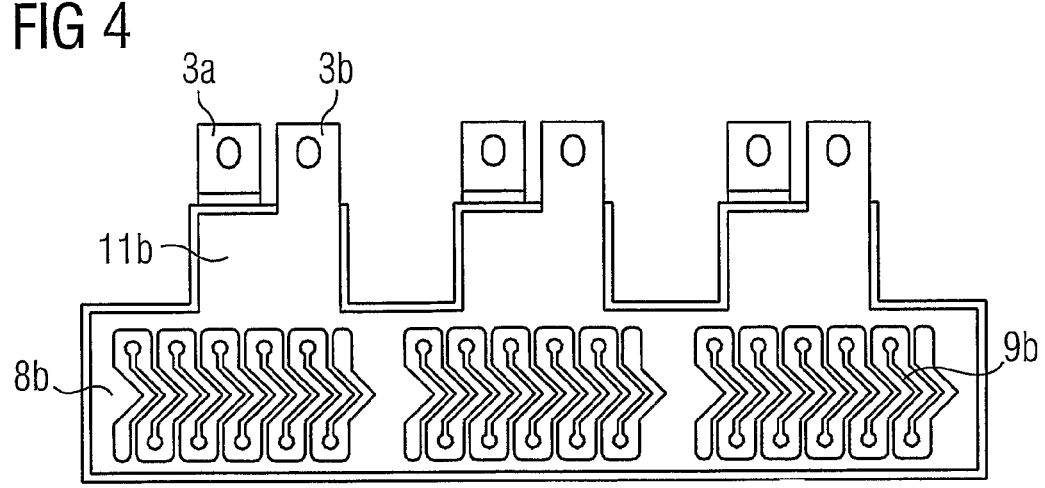
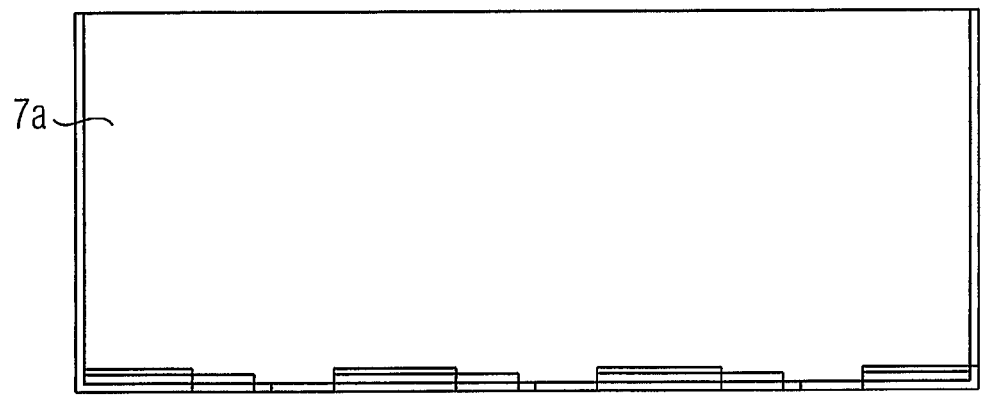
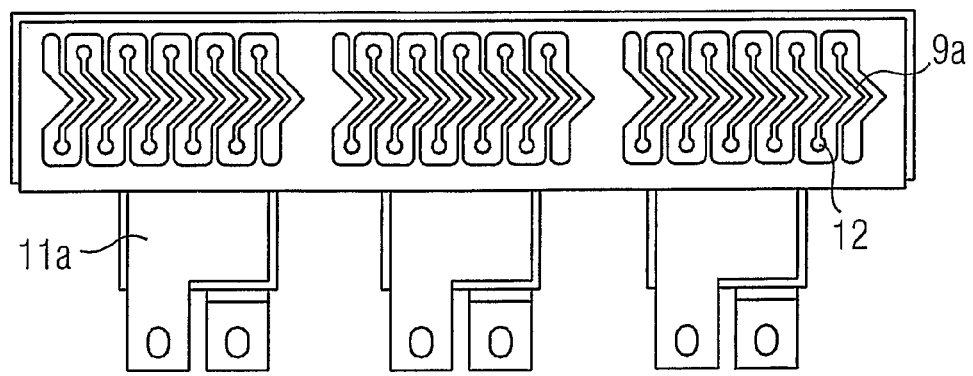

POWER CAPACITOR

BACKGROUND

A capacitor is described in EP 0 598 256 B1.

SUMMARY

A power capacitor has a capacitor winding and a housing. The capacitor winding can be constructed using an MPM film winding technique. The dielectric for the film winding can be polyester, PEN, PPS, or also polypropylene. Flat windings and round windings can be used. Round windings may be formed so that their geometries correspond to those of flat windings. Several round windings combined—e.g., one next to the other—may also be used.

In an embodiment, a dielectric made from polyester can have a dielectric constant of 3.3. A dielectric made from polyester can be very stable thermally.

A power capacitor is also described, which is for absorbing high electric currents. The maximum current that can be absorbed can be between 50 and 300 amperes.

The nominal voltage of the power capacitor may be between 150 and 600 volts.

In the housing of the power capacitor, one or also several capacitor windings can be provided, which contribute to the capacitance of the capacitor. For example, two capacitor windings, each with a capacitance of one millifarad, can be stacked one above the other and connected by a parallel circuit to form a nominal capacitance of $C_{Nom}=2$ mF. The capacitance, however, can also have other values.

The film thickness of the dielectric contained in the film winding may be a few microns, e.g., around 3 μm. An especially large capacitance can be achieved, which requires relatively little space and has adequate electric strength.

In an embodiment of the power capacitor, a capacitor winding is provided on two side surfaces with a Schoop layer. Here, the capacitor winding can include a flame-sprayed or arc-sprayed metallic layer, which may contain zinc or a film construction. A possible film construction contains a film with zinc and a film with copper.

Through a suitable selection of the geometries of the capacitor winding, Schoop layer, and housing, a capacitance can be set between the capacitor elements and the housing (also terminal-housing capacitance), which is suitable for suppressing interference in an inverter and which has generally favorable properties in terms of EMC (electromagnetic compatibility).

In one embodiment of the power capacitor, a winding is contacted by two contact films arranged on opposing sides of the film winding. These contact films can be, for example, Schoop layers.

In one embodiment of the power capacitor, several capacitor windings are contained in the capacitor housing, with each contact film of the individual windings to be connected to a common external pole lying on the same side of the power capacitor.

In one embodiment of the power capacitor, power is fed from the external connections of the capacitor to the capacitor windings via a twin lead. A twin lead can be assembled from two individual bus bars or also electrically conductive sheets. The electrically conductive sheets may be formed so that the thickness of the sheet is significantly less than the extent of the sheet perpendicular to the thickness, that is, in the width and length directions. Two such bus bars can be placed one above the other with the smallest possible spacing and thus form a twin lead.

In one embodiment of the power capacitor, insulation is also provided between the two electrically conductive sheets.

In addition, between the conductive sheets, another electrical conductor can also be integrated, which forms a Y-capacitor relative to ground with the conductive sheets.

The other electrical conductor is insulated from the conductive sheet by a two or more layer film insulation and connected to ground. The two or more layer film insulation has the advantage that, especially for the construction of the Y-capacitor as a non-self-healing capacitor, adequate insulation can be provided between the conductive capacitor elements.

The insulation can be a film material made from polypropylene, polycarbonate, or polyester, which may have a film thickness from 10 to 100 μm. The insulation can also have two or more layers, especially in the case of non-self-healing capacitors.

In another embodiment of the power capacitor, power is fed from one electrical pole, starting from one or more outer connection elements, to contact surfaces of one or more capacitor windings by a bus bar or by an electrically conductive sheet.

The possibilities mentioned for feeding power to the film windings have the advantage that the inherent inductance of the power capacitor can be reduced.

According to another embodiment, contact to a contact surface of a winding is realized by a plurality of flexible contact fingers. These contact fingers may be formed so that they run in a common plane and each have high flexibility, that is, high elasticity, in at least two directions perpendicular to each other. In an embodiment, the contact fingers are stamped from a sheet.

The electrical contacting between a contact finger and a contact surface of a capacitor winding may be in an end region of the contact finger, e.g., at the end of the contact finger. The contacting can be realized, for example, by soldering or also welding.

According to another embodiment, the contact fingers are stamped from a sheet-metal strip, which is part of an angled sheet. Likewise, a bus bar or an electrically conductive sheet is part of this same angled sheet. The sheet-metal strip, from which the highly flexible contact fingers are stamped, can be produced, for example, by angling a sheet, with the non-angled part of the sheet being used for the current feed to the capacitor winding and with the angled part of the sheet being processed by stamping.

According to another embodiment, a twice-angled sheet may be contained in the capacitor. The central piece of this sheet forms a bus bar for feeding current to capacitor windings. A part angled at one end of the bus bar is used for constructing highly flexible contact fingers. At the other end of the bus bar, that is, on the side of the bus bar opposite the contact fingers, contact sheets are bent away, which form external contact elements on the outside of the power capacitor.

The highly flexible contact fingers can be shaped in a first embodiment of the capacitor as narrow strips which run essentially in a straight line.

In one embodiment of the capacitor, the highly flexible contact fingers are shaped so that they run along a track curved several times. For example, the contact fingers can run along a meander-like path.

The contact fingers may be bent several times, alternating in different directions. According to another embodiment, several highly flexible contact fingers are arranged one next to the other and held there by an external frame. Contact fingers may project alternately from the lower end of the frame and from the upper end of the frame, coming into the center of the area enclosed by the frame.

In another embodiment of the capacitor, a twice-angled surface is provided, with the base of this sheet being formed by a bus bar. At one end, on a longitudinal edge of the bus bar, an angled part is provided for stamping highly flexible contact fingers. In the opposite direction, on the same outer edge of the sheet, contact elements are bent, which are used for forming external contacts of the capacitor.

In another embodiment of the power capacitor, two sheet-metal strips overlap each other at least partially, with each of the sheet-metal strips being part of a bent sheet. Each of the sheet-metal strips is also constructed as a bus bar, that is, it is used for feeding power or current to one or more capacitor windings.

In another embodiment of the capacitor, highly flexible contact fingers that are connected conductively to each other also connect several capacitor windings to each other in an electrically conductive way on one and the same side of the capacitor and thus realize, for example, a parallel circuit of several capacitor windings.

In another embodiment, a series circuit of several capacitor windings is realized by the contact fingers.

The highly flexible contact fingers should be constructed so that, in terms of their mechanical flexibility, they also guarantee electrical contact to the contact surface of a capacitor winding when it moves, for example, due to heating or mechanical loading in a motor vehicle, with the electrically conductive connection or solder point being loaded mechanically between the contact fingers and contact area. Therefore, the vibration resistance of the component can be reinforced.

According to another embodiment of the capacitor, the sheet-metal strips used for producing contact fingers, the sheet sections forming the external contacts, and also the sheet sections that are part of a twin lead are not a component of a sheet shaped by bending, but instead they can also be a component of a circuitry unit or power supply unit. The individual components of a circuitry unit are assembled through welding, soldering, or through other suitable processes for connecting several separate parts to a mechanically stable unit.

To reduce the inherent inductance of the capacitor, it is advantageous if the twin lead is arranged and connected so that it carries a flow of current in the opposite direction as soon as the capacitor is fed current from the outside.

In one embodiment of the capacitor, several external connections are provided. Here, every two external connections form a connection pair, with a first connection of the connection pair being allocated to a first polarity and a second connection of the pair being allocated to a second polarity. The allocation of one connection to a polarity does not exclude alternating-current operation. Instead, the allocation of an external connection to a polarity merely means the allocation of an external connection to a contact or to an area with uniform electrical potential in the capacitor, which can be a connection area of a capacitor element. Three pairs of external contacts may be provided.

In an embodiment of the capacitor, each external contact is divided into an upper and a lower part. The lower parts of the external contacts, which belong to a pair of external contacts, here overlap each other and are electrically isolated from each other. These lower parts of the external contacts thus form a twin lead and are also designated below as shoulders of the external contacts. The contact tab projects outwardly from a shoulder of an external contact in the upper region of the external contact. The contact tabs of a pair of external contacts here lie next to each other, as seen in a top view.

This embodiment of the contact tabs has the advantage that forming a contact with the contact tab can be realized by passing an electrically conductive element, for example, by passing an electrically conductive bolt or also an electrically conductive screw, through a hole of the contact tab. Because the contact tabs are arranged one next to the other in a top view, a secure isolation of the contact tabs from each other and also a secure isolation of the contact elements belonging to a contact tab for forming additional contacts can be ensured.

Three pairs of external contacts may be provided for connecting the power capacitor. This has the advantage that a power capacitor can be used particularly easily for connecting an inverter, where each of the three IGBT modules (Insulated Gate Bipolar Transistor) contained in the inverter is connected to a pair of external contacts.

The use of several pairs of external contacts for connecting the capacitor also has the advantage that the energizing power is distributed to three different contact points, e.g., with maximum spacing from each other, and in this way achieved a further reduction of the inherent inductance of the capacitor.

The pairs of contact elements may be arranged in a line.

Copper can be used as the material for the circuitry strips or the circuitry units. A sheet thickness of 0.5 to 5 mm may be used.

In an embodiment of the capacitor, the housing has the shape of a trough, with the trough having a base and, for example, four side walls, as well as an open upper end. On the side surfaces of the trough, mounting eyelets or mounting elements can be provided, with whose help the power capacitor can be mounted to another electronic element. On the upper side of the housing, a peripheral groove can also be provided for receiving a sealing ring.

For fixing a capacitor winding in the housing, an insulating shell can be provided, which is placed—to some extent as a second trough—in the lower region of the housing. The capacitor winding is then placed in the insulating trough. For forming an insulating seal of the capacitor at the open end of the housing, a second insulating shell is set on the top side.

In an embodiment, the lower and the upper shells expand to form an essentially closed housing.

In an embodiment of the capacitor, the upper shell may have openings through which the external contact elements or pairs of contact elements can project. Electrically insulating collars, which are used for insulating the external contact elements, can be arranged at the openings of the upper shell.

In an embodiment of the capacitor, a cooling surface is provided on the top side, which can be used for cooling the capacitor. Such a cooling surface can be formed in by a sheet-metal strip or a twin lead which is part of the circuitry unit of the capacitor. The current may be fed via sheet-metal strips or a twin lead to the capacitor windings. For example, the upper of two electrically conductive sheets can be used as a cooling element. Through a suitable construction of the circuitry unit, the upper electrically conductive sheet forms an adequate seal with the upper edge of the housing, which can provide a good mechanical contact, such as a good thermomechanical contact of the upper sheet to another housing to be mounted on the top side—which provides, e.g., a cooling plate.

In order to reduce the risk of short circuits, it is advantageous if electrical insulation is arranged on the surface of the cooling element. For example, such insulation can be formed by a transparent insulating film, which is only a few microns thick and which thus only insignificantly hinders the heat transfer. In another embodiment, the electrical insulation is guaranteed by the upper of two insulating shells, wherein the heat conduction is produced, such that the wall thickness of the insulating shell is selected to be sufficiently thin. The wall thickness can be, for example, 0.3 mm.

In addition, an electrical module will be described, with a first unit of the module involving an electronic system containing, e.g., IGBT modules. In general, the first unit can be an electrical device for power electronics. Another unit of the module is the capacitor described here. The top side of the capacitor or the housing of the capacitor may form a surface-area contact with the bottom side of the first unit. The external contacts of the capacitor here project into the housing of the first unit and are connected there, for example, by screws, to the IGBTs located there. The first unit need not necessarily contain IGBTs; it can also contain other electronic components or also mechanical components.

The bottom side of the first unit, that is, the side of the first unit in contact with the capacitor, may be equipped with a device for dissipating heat. Such a device can be, for example, a metal plate provided with holes. However, such a device could also be constructed in the form of cooling ribs.

There may be good surface contact between the upper bus bar of the power supply unit in the capacitor and the cooling device of the first unit. Therefore, advantageously, there is good dissipation of the heat generated in the capacitor to the outside. In an embodiment of the capacitor, the top side of the capacitor is formed by a thin insulating film which has low heat resistance and thus provides for a good heat transfer from the capacitor to the first unit of the electronic module.

The embodiments described here will be explained in more detail below with reference to the figures.

DESCRIPTION OF THE DRAWINGS

FIG. 4 shows the energizing units.

DETAILED DESCRIPTION

The dimensional information shown in the figures is to be understood merely as an example. It does not limit the embodiments described here. Identical elements or elements with the identical function are designated by the same reference symbols.

Figure 1:
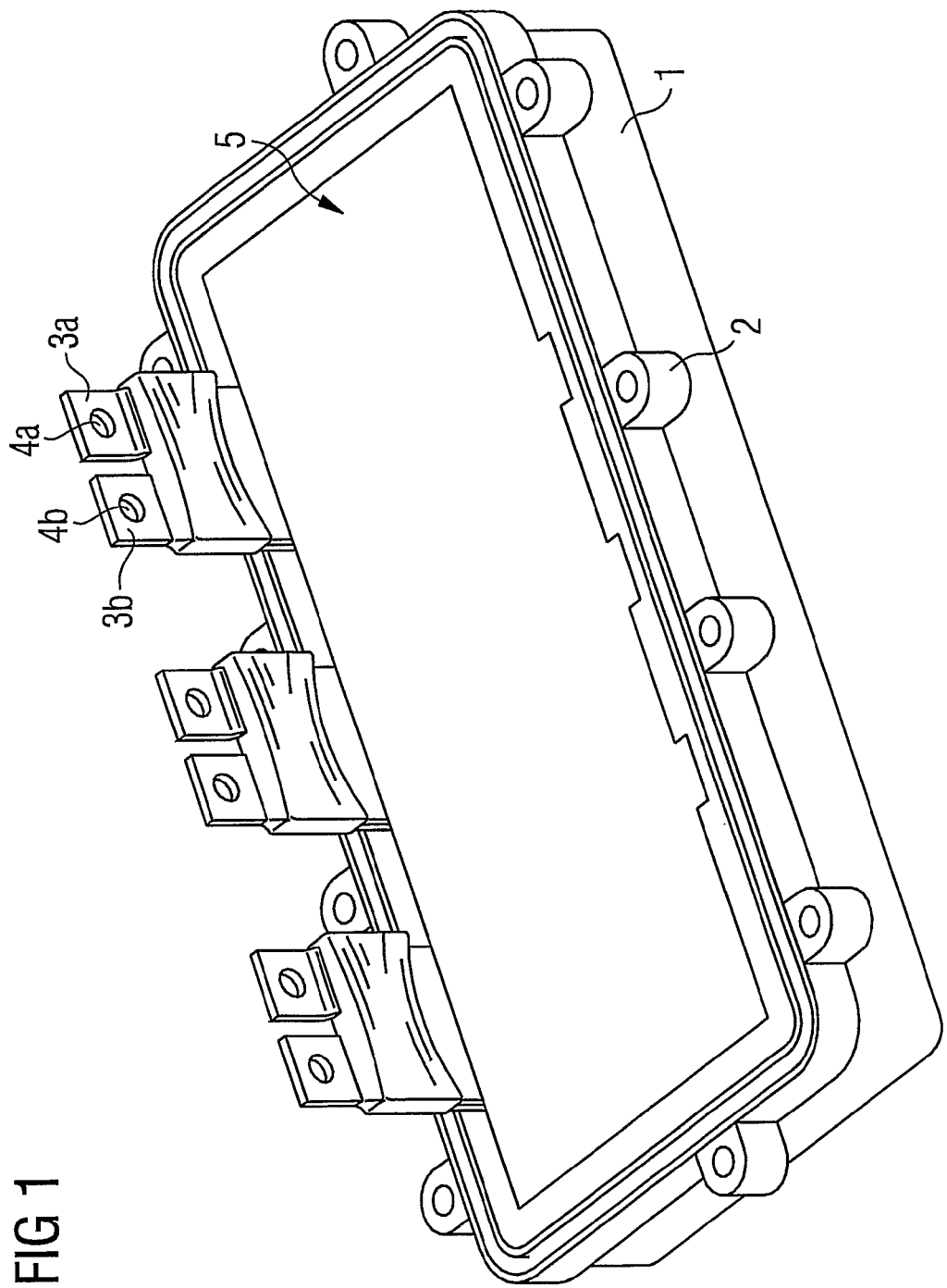
FIG. 1 shows a capacitor in a perspective view.

FIG. 1 shows a capacitor with a housing 1, on whose top side several mounting eyelets 2 are arranged in the peripheral direction. With the aid of the mounting eyelets 2, the capacitor can be mounted on another electronic unit. Such a unit is shown, for example, in FIG. 7.

Figure 2:
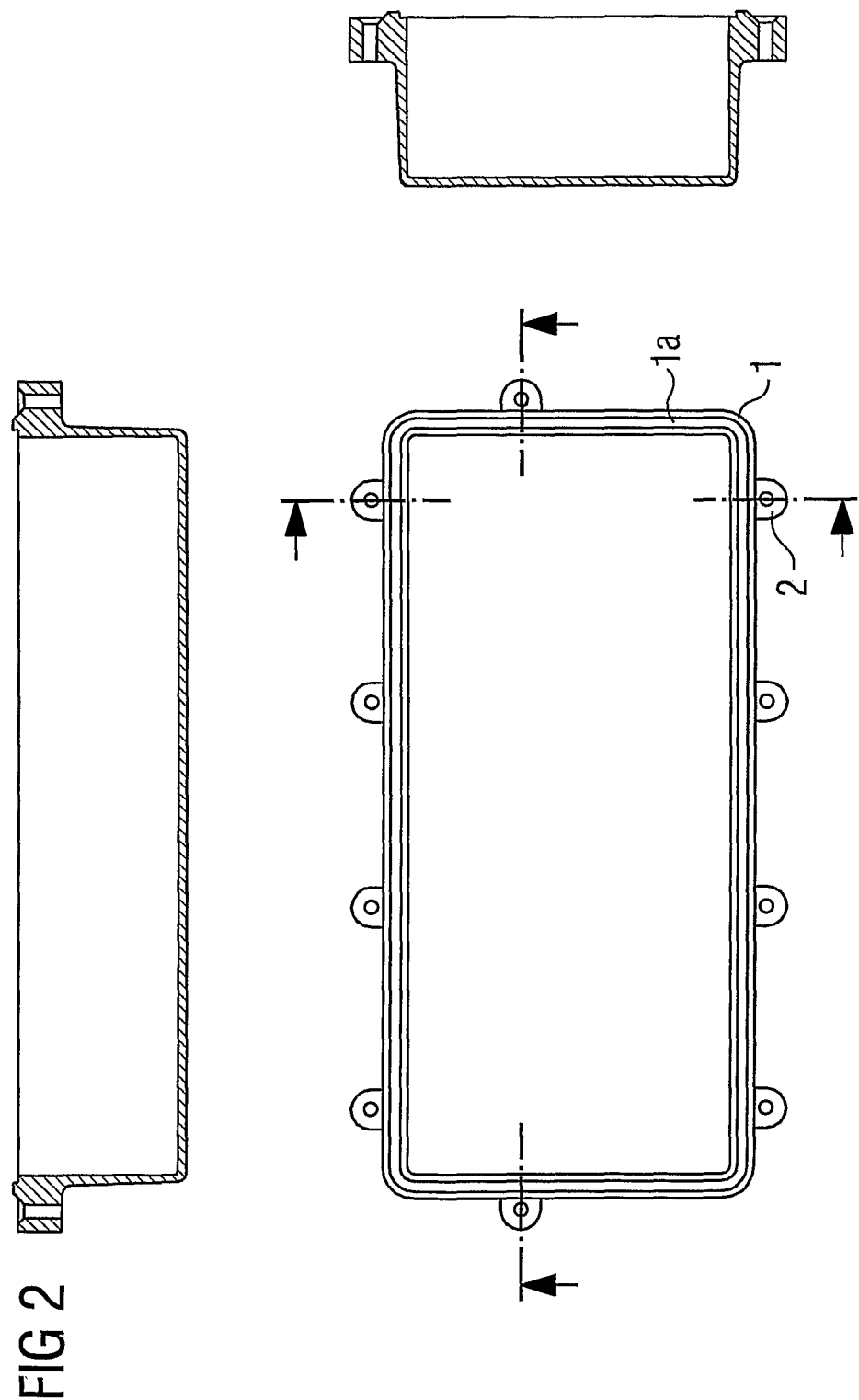
FIG. 2 shows, as an example, the enclosing shell of the capacitor from FIG. 1.

FIG. 2 shows the housing as a construction drawing. The housing 1 can be made from, for example, aluminum, or can contain aluminum. The length of the housing equals approximately 25 cm. The width of the housing equals around 12 cm. 10 mounting eyelets are arranged on the periphery of the housing. The number of mounting eyelets, however, can vary according to the size of the housing and the mechanical stability required to attach the housing to another electronic unit. The depth of the trough-shaped housing equals approximately 6 cm. On the top side of the housing there is a peripheral groove 1a, which is used for holding a sealing compound or a sealing ring.

Figure 3:
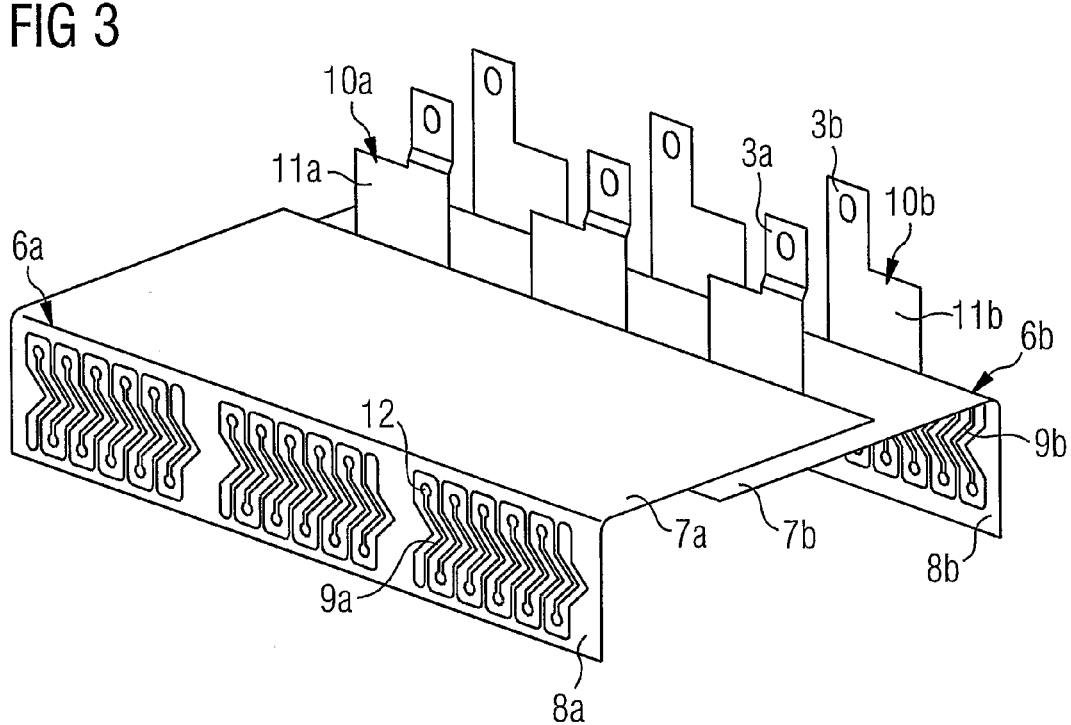
FIG. 3 shows two energizing units for the capacitor from FIG. 1 in a perspective view.

FIGS. 3 and 4 show two energizing units 6a, 6b. The bus bars 7a and 7b are the central components of the energizing units 6a, 6b, respectively. The bus bars 7a, 7b essentially overlap each other, with insulation 5a still being arranged between the two bus bars. The insulation 5a has a multiple-layer construction, if necessary. The insulation 5a forms a twin lead together with the bus bars 7a, 7b. The bus bars are constructed as a bus bar.

As a component of the energizing unit 6a, a contacting sheet 8a, in which contact fingers 9a are produced, for example, through stamping, is bent downward and away from the bus bar 7a. At the end of the contact finger there is the solder area 12 for soldering the contact area of a capacitor winding. Like the bus bar 7a, a contacting sheet 8b is also bent downward and away on the opposite side of the contacting sheet 8a for the bus bar 7b.

The contacting sheets 8a, 8b need not necessarily be produced by bending a sheet. They can also be attached as separate parts to the appropriate bus bar. On the right side of FIG. 3A or in the upper region of FIG. 3 there are contact sheets extending upwardly in this region. Three contact sheets are provided for each bus bar. The number of contact sheets, however, can also be increased or decreased according to the application of the capacitor. A feature for decreasing the inductance of the capacitor is that it is fed current by a bus bar, which allows a low-inductance distribution of the current over a large surface area.

The contact sheets 10a, 10b projecting upward here have a shoulder region 11a, 11b in the lower region, wherein corresponding contact sheets, that is, contact sheets forming a pair of external contacts, have overlapping shoulder regions 11a, 11b that may be formed as a bus bar. Then the external connections 3a, 3b connected to the shoulder regions are no longer overlapping because these form another contact by hole 4a, 4b in an embodiment of the capacitor.

Figure 3A:
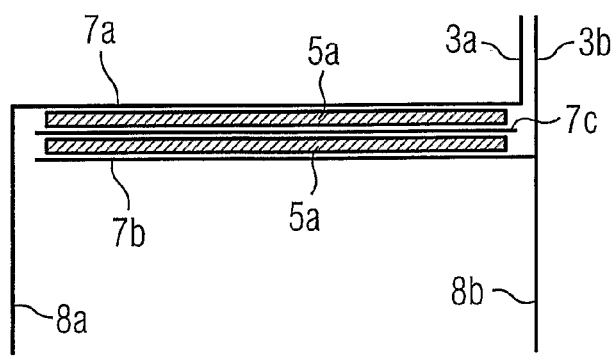
FIG. 3A shows bus bars in cross section.

In FIG. 3A, another bus bar 7c can be seen, which is arranged between the bus bar 7a and the bus bar 7b, and is electrically insulated from these bus bars. The bus bar 7c may be connected to ground. The insulation is realized with the insulating layers 5a. The insulating layers are shown with a one-layer construction, but they can have a two or even more layer construction. In particular, the insulation can be realized by multiple-layer insulating films. With the aid of such an additional bus bar, in an embodiment of the capacitor, a Y-capacitance of the capacitor relative to the housing can be realized.

Figure 5:
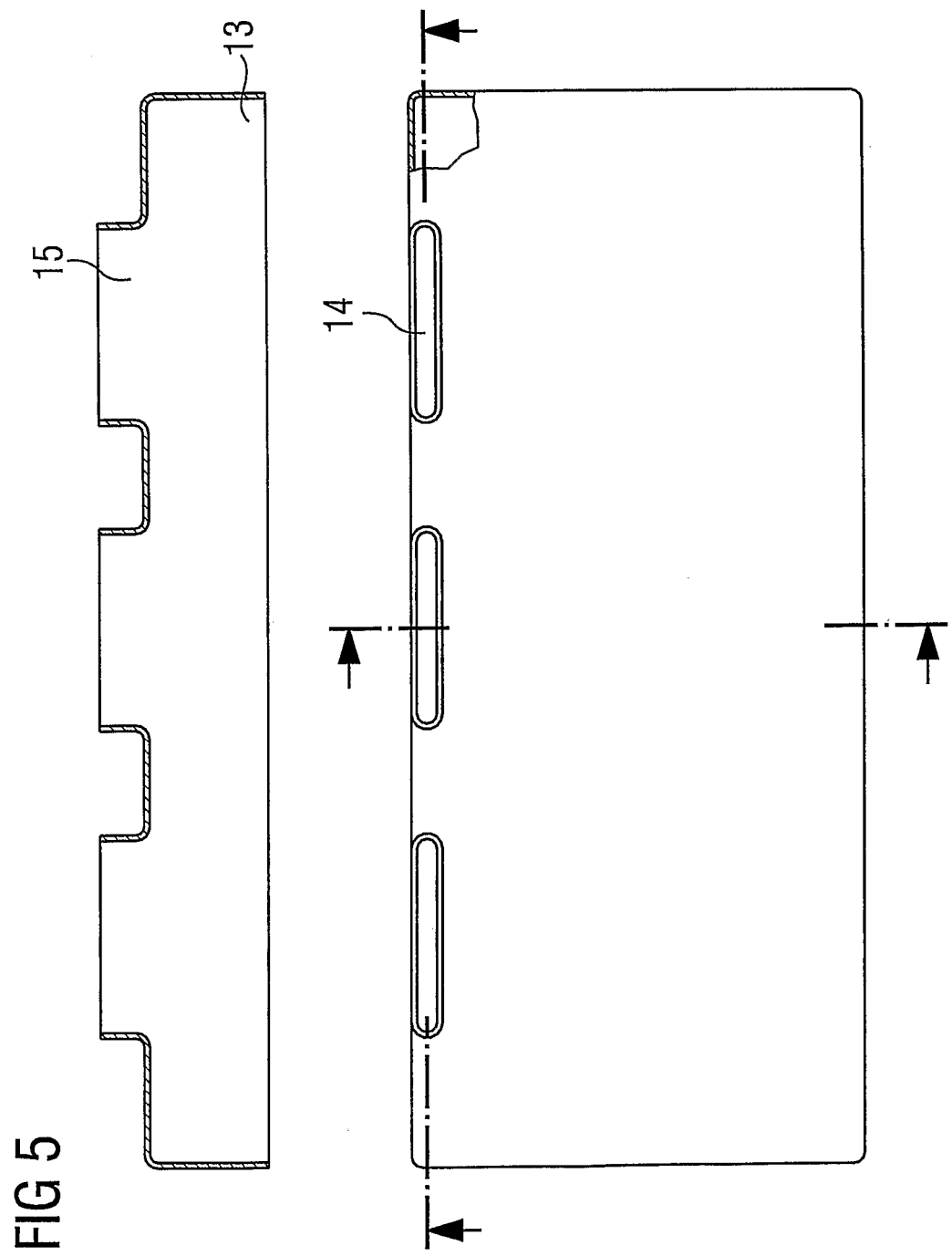
FIG. 5 shows the upper part of an insulating shell.

FIG. 5 shows the upper part of an insulating shell, which can be arranged between the capacitor winding or windings and the housing of the capacitor. The shell may be comprised of insulating material, for example, polycarbonate or PP, with a thickness of 0.3 to 0.5 mm. The upper half-shell 13 is shaped so that it can be placed over the capacitor winding somewhat like a cap. It is provided with longitudinal holes 14 through which the external contacts of the power-feed elements can project. In the area of the holes 14, collars 15 can be arranged, which insulate the lower region of the external connections.

The wall thickness of the upper half-shell 13 should be relatively thin, at least in the upper (cap) region, in order to guarantee good cooling from the top side of the capacitor.

Figure 6:
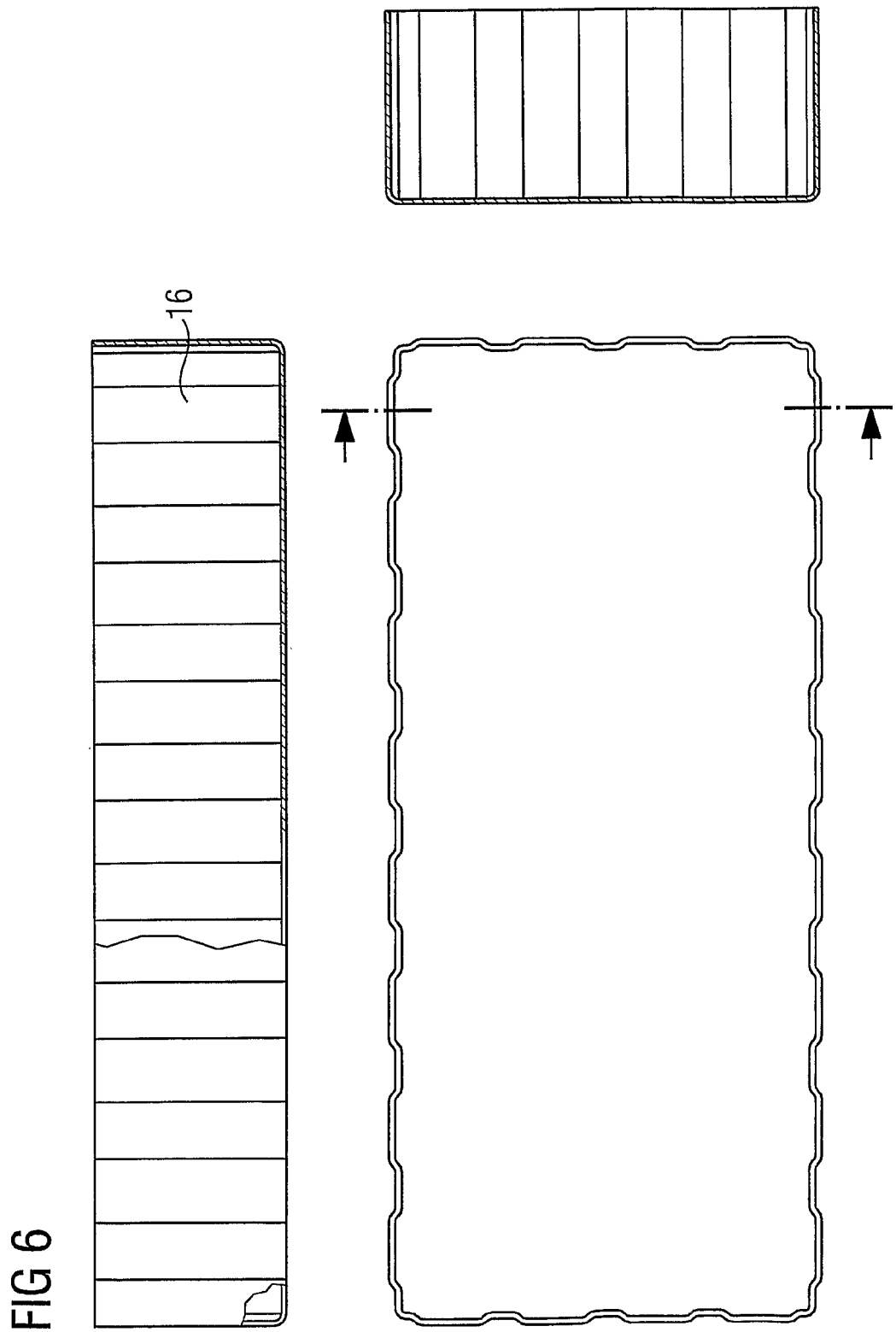
FIG. 6 shows the lower part of an insulating shell.

FIG. 6 shows a lower half-shell 16, which is may be placed in the housing before the capacitor winding. It is produced, like the upper half-shell 13, e.g., from insulating material.

Figure 7:
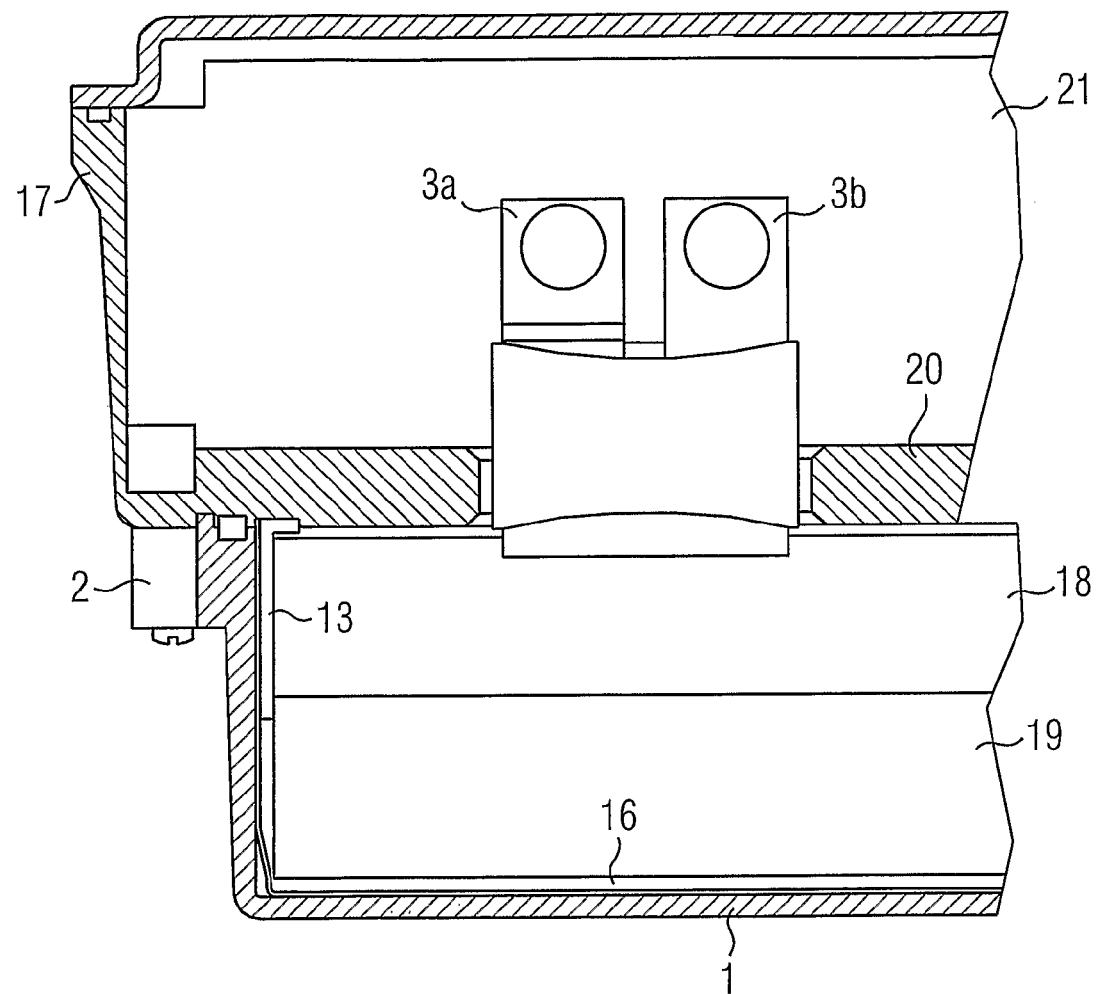
FIG. 7 shows an electrical module in a schematic cross section.

FIG. 7 shows a capacitor as a component of an electronic unit, which can be, for example, an inverter. The electronic unit 21 here contains several IGBT modules in a housing 17. On the bottom side of the housing 17 there is a capacitor, which is mounted on the housing 17, for example, by screws by the mounting eyelets 2.

The external connections 3a or 3b project through holes in the housing 17 into the interior of the electronic unit 21. A cooling plate 20, which is suitable for dissipating heat, is provided on the bottom side of the housing 17. The bottom side of the cooling plate 20 is in direct thermal contact with the elements of the capacitor, especially with the top side of the upper half-shell from FIG. 5 forming the upper enclosure of the capacitor. The top side of the capacitor can also be formed by a transparent insulating film 5 from FIG. 1, especially when the capacitor windings are held by a sealing compound in the housing of the capacitor.

In FIG. 7, the capacitance of the capacitor is formed essentially by two capacitor windings 18, 19, which are placed one above the other in the housing. An insulating half-shell 16 in the form of a lower half-shell is arranged between the capacitor windings and the housing 1 of the capacitor.

Figure 8:
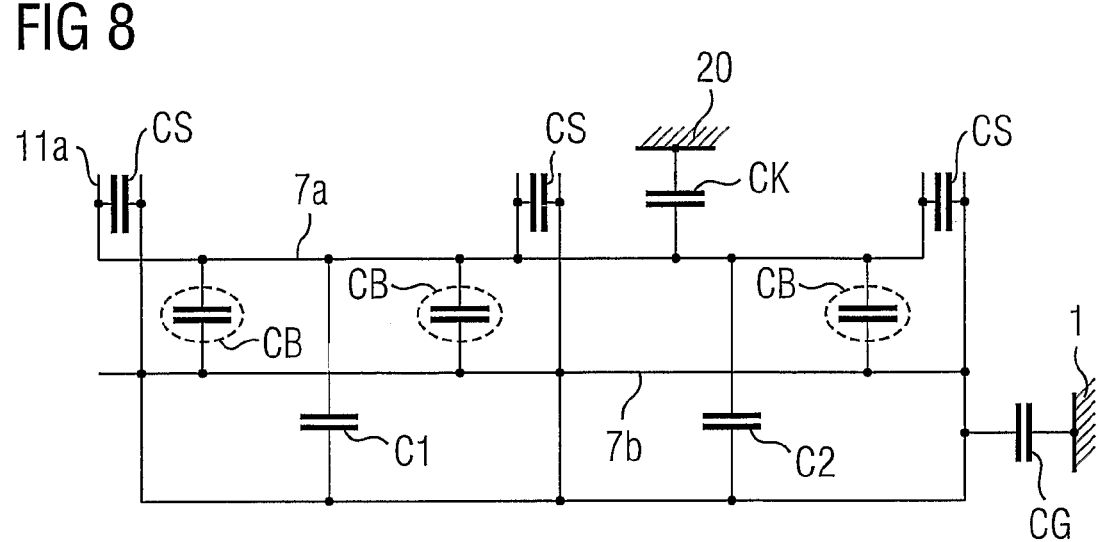
FIGS. 8 and 9 show equivalent circuit diagrams for capacitors.

FIG. 8 shows, in an equivalent circuit diagram, first the main capacitances of the capacitors C1, C2 when using two capacitor windings. The capacitances CB represent the capacitance of the twin lead. The capacitances CS represent the capacitances of opposing shoulder areas of the external connections of the capacitor. The capacitance CG here represents the capacitance of the twin leads opposite the housing 1. The capacitance CK represents the capacitance of the upper bus bar relative to the cooling plate 20.

Figure 9:
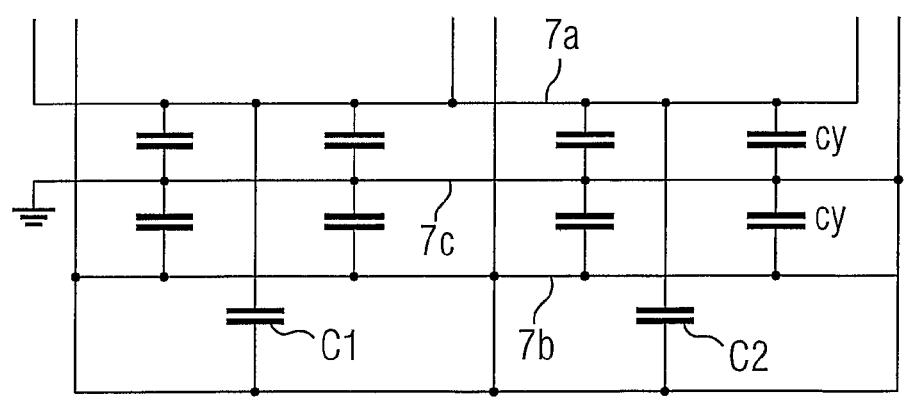

FIG. 9 shows an equivalent circuit diagram corresponding to FIG. 8 when another electrical conductor according to FIG. 3A is provided. A Y-capacitance is formed, which is represented as a distributed capacitance CY for reasons of clarity. The additional bus bar 7c is connected to ground.

What is claimed is:

1. A capacitor comprising:
   a housing;
   one or more capacitor windings; and
   contact fingers that are flexible in mutually orthogonal directions, the contact fingers being electrically connected to the one or more capacitor windings and being configured to flex so as to maintain electrical connection to the one or more capacitor windings during movement of the one or more capacitor windings, the contact fingers being parts of sheet-metal strips that form bus bars.

2. The capacitor of claim 1, which is configured to receive electrical current between 50 amperes and 300 amperes.

3. The capacitor of claim 2, wherein the one or more capacitor windings comprise at least two capacitor windings, and wherein the at least two capacitor windings are electrically connected via bus bars.

4. The capacitor of claim 3, wherein at least one capacitor winding of the one or more capacitor windings is configured to receive current via contact layers on opposite sides of the at least one capacitor winding.

5. The capacitor of claim 1, wherein the one or more capacitor windings comprise at least two capacitor windings, and wherein the at least two capacitor windings are electrically connected via the bus bars.

6. The capacitor of claim 5, wherein the bus bars form a twin lead.

7. The capacitor of claim 6, wherein the twin lead comprises an insulating layer having a thickness between 10 μm and 100 μm.

8. The capacitor of claim 5, further comprising:
   an electrical conductor between two of the bus bars configured to form a Y-capacitor.

9. The capacitor of claim 8, wherein the electrical conductor is insulated from the bus bars via a two or more layer film insulation.

10. The capacitor of claim 5, wherein at least one of the bus bars corresponds to an essentially exposed cooling surface in an edge region of the capacitor.

11. The capacitor of claim 1, wherein at least one capacitor winding of the one or more capacitor windings is configured to receive current via contact layers on opposite sides of the at least one capacitor winding.

12. The capacitor of claim 1, wherein the contact fingers comprise portions of the sheet metal strips that have been stamped.

13. The capacitor of claim 1, wherein contact between at least one of the contact fingers and a contact surface of at least one capacitor winding of the one or more capacitor windings is effected in an end region of the at least one contact finger.

14. The capacitor of claim 1, wherein the bus bars are for feeding current to the one or more capacitor windings.

15. The capacitor of claim 1, wherein the contact fingers are bent in several places.

16. A power electronics module comprising:
   a capacitor according to claim 1;
   an electronic unit having a base on which the capacitor is mounted; and
   a cooling plate in direct contact with, and in thermal contact with, a cooling surface of the capacitor, the cooling plate being on the base of the electronic unit.

17. The module of claim 16, further comprising:
   an electrical insulating film on a side of the cooling surface facing the electronic unit.

18. The module of claim 16, wherein the electronic unit comprises IGBTs.

19. The power electronics module of claim 16, wherein the cooling plate comprises a plane surface area that is in contact with the cooling surface formed by the bus bar.

20. The capacitor of claim 1, wherein an electrical conductor is between two of the bus bars, and wherein the electrical conductor is insulated from the two bus bars via film insulation.

21. A capacitor comprising:
   a housing;
   one or more capacitor windings; and
   contact fingers that are in a common plane, that are along a track that curves at least two times, that are flexible in mutually orthogonal directions, and that are electrically connected to the one or more capacitor windings, the contact fingers being parts of sheet-metal strips that form bus bars.

22. A capacitor comprising:
   a housing;
   one or more capacitor windings; and
   contact fingers that are in a common plane, each of the contact fingers being adjacent to another of the contact fingers on an external frame, the contact fingers being flexible in mutually orthogonal directions and being electrically connected to the one or more capacitor windings, the contact fingers being parts of sheet-metal strips that form bus bars.

23. The capacitor of claim 22, wherein ones of the contact fingers project alternately from opposite sides of the external frame.

* * * * *